(12) United States Patent
Kudana et al.

(10) Patent No.: US 10,827,184 B2
(45) Date of Patent: Nov. 3, 2020

(54) METHODS AND SYSTEMS FOR ENCODING OF MULTIMEDIA PICTURES

(71) Applicant: Texas Instruments Incorporated, Dallas, TX (US)

(72) Inventors: Arun Shankar Kudana, Bengaluru (IN); Uday Pudipeddi Kiran, Bengaluru (IN); Anurag Mithalal Jain, Bengaluru (IN); Soyeb Nagori, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 135 days.

(21) Appl. No.: 15/888,967

(22) Filed: Feb. 5, 2018

(65) Prior Publication Data

US 2018/0234683 A1 Aug. 16, 2018

Related U.S. Application Data

(63) Continuation of application No. 13/644,272, filed on Oct. 4, 2012, now Pat. No. 9,888,244.

(30) Foreign Application Priority Data

Oct. 5, 2011 (IN) ............................ 3449/CHE/2011

(51) Int. Cl.
| | |
|---|---|
| *H04N 19/152* | (2014.01) |
| *H04N 19/172* | (2014.01) |
| *H04N 19/115* | (2014.01) |
| *H04N 19/149* | (2014.01) |
| *H04N 19/124* | (2014.01) |

(52) U.S. Cl.
CPC ......... *H04N 19/152* (2014.11); *H04N 19/115* (2014.11); *H04N 19/172* (2014.11); *H04N 19/124* (2014.11); *H04N 19/149* (2014.11)

(58) Field of Classification Search
CPC .................................................... H04N 19/152
USPC ..................................................... 375/240.03
See application file for complete search history.

(56) References Cited

U.S. PATENT DOCUMENTS

| | | | |
|---|---|---|---|
| 2008/0232459 A1* | 9/2008 | Auyeung ............. | H04N 19/147 375/240.01 |
| 2009/0168900 A1* | 7/2009 | Shimoyama ..... | H04N 21/23406 375/240.26 |
| 2010/0195713 A1* | 8/2010 | Coulombe ........... | H04N 19/172 375/240.02 |
| 2011/0110422 A1* | 5/2011 | Nagori ................. | H04N 19/159 375/240.03 |

(Continued)

OTHER PUBLICATIONS

Prosecution History for U.S. Appl. No. 13/644,272, from Oct. 4, 2012 to Jan. 18, 2018 (253 pages).

*Primary Examiner* — Yulin Sun
(74) *Attorney, Agent, or Firm* — Ebby Abraham; Charles A. Brill; Frank D. Cimino (57) ABSTRACT

Several methods and systems for encoding of multimedia pictures are disclosed. In an embodiment, an occupancy level of a coded picture buffer (CPB) associated with a hypothetical reference decoder (HRD) is estimated at an instant of removal of an access unit corresponding to a multimedia picture from the CPB for decoding the access unit. A number of bits for encoding the multimedia picture is allocated based on the estimated occupancy level of the CPB. The multimedia picture is encoded based on the allocated number of bits.

20 Claims, 6 Drawing Sheets

(56) References Cited

U.S. PATENT DOCUMENTS

2012/0008695 A1\* 1/2012 Wu .................... H04N 19/176
　　　　　　　　　　　　　　　　　　　　　375/240.27

\* cited by examiner

METHODS AND SYSTEMS FOR ENCODING OF MULTIMEDIA PICTURES

CROSS REFERENCE TO RELATED APPLICATIONS

This application is a continuation of U.S. patent application Ser. No. 13/644,272, filed Oct. 4, 2012, which application claims the benefit of provisional patent application number 3449/CHE/2011, filed on Oct. 5, 2011, in the Indian Patent Office, both of which are incorporated herein by reference in their entirety.

TECHNICAL FIELD

The present disclosure generally relates to the field of encoding of multimedia pictures.

BACKGROUND

Pursuant to an exemplary scenario, multimedia data, such as a video content, may be encoded (e.g., compressed) for transmission and/or storage purposes. The multimedia data may include a plurality of multimedia pictures (e.g., multimedia frames or fields). During encoding, a multimedia data encoder (hereinafter referred to as an encoder) may compress multimedia pictures in an on-going manner, such that each encoded multimedia picture is associated with a number of bits. The generated bit stream may be transmitted over a transmission channel to a multimedia data decoder (hereinafter referred to as a decoder). The transmitted bits may be stored in a decoder buffer associated with the decoder till the decoder removes those bits for decoding purposes. The encoder may need to ensure that at any given point of time, the bit stream is always contained wholly within the decoder buffer. A buffer underflow (not enough bits in the decoder buffer for decoding a multimedia picture) will result in stalls during multimedia playback while a buffer overflow at the decoder buffer will result in loss of data.

The bit stream may be transmitted over various transmission channels, which may be associated with different transmission capacities (bit rates). Further, the decoder may reside on any of a variety of multimedia devices, such as mobile phones, music players, computing devices and the like, and hence may be associated with different decoder buffer sizes. The variety in transmission bit rates and the decoder buffer sizes makes it difficult for the encoder to estimate the desired bit allocation for encoding multimedia pictures, such that the decoder buffer does not suffer from buffer underflow or buffer overflow. If a number of bits allocated for encoding multimedia pictures is large than the decoder buffer may suffer from buffer underflow. If a number of bits allocated for encoding multimedia pictures is low, then a multimedia data quality may be compromised.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

Various methods and systems for encoding of multimedia pictures are disclosed. In an embodiment, a method includes estimating an occupancy level of a coded picture buffer (CPB) associated with a hypothetical reference decoder (HRD) at an instant of removal of an access unit corresponding to a multimedia picture from the CPB for decoding the access unit. The method further includes allocating a number of bits for encoding the multimedia picture based on the estimated occupancy level of the CPB.

In an embodiment, a track of an arrival time at the CPB and a removal time from the CPB for each access unit received at the CPB is maintained. In an embodiment, the occupancy level of the CPB is estimated at a plurality of instances of time based on at least one of the track maintained of access units received at the CPB and a transmission channel bit rate corresponding to the received access units at the CPB. In an embodiment, the transmission channel bit rate is one of a constant bit rate (CBR) and a variable bit rate (VBR).

In an embodiment, estimating the occupancy level of the CPB comprises estimating an upper limit on the number of bits to be allocated for encoding the multimedia picture. In an embodiment, the upper limit is estimated for preventing an occurrence of buffer underflow at the CPB.

In an embodiment, a maximum multimedia picture size for encoding the multimedia picture is determined. A number of bits consumed during encoding of macroblocks corresponding to the multimedia picture is tracked. In an embodiment, a quantization parameter value is increased up to a pre-defined maximum quantization parameter value for encoding of remaining macroblocks corresponding to the multimedia picture if a number of bits associated with the maximum multimedia picture size is likely to be exceeded during encoding of the macroblocks. In an embodiment, skip-macroblock encoding of remaining macroblocks corresponding to the multimedia picture is performed if the number of bits associated with the maximum multimedia picture size is likely to be exceeded during encoding of the remaining macroblocks based on the pre-defined maximum quantization parameter value.

In an embodiment, buffering period supplemental encoder information (SEI) is transmitted at pre-defined intervals to the CPB for facilitating decoding of access units received at the CPB from an intermediate access unit in corresponding access unit sequence. The buffering period SEI comprises an initial removal delay for access units programmed to match corresponding instances of removal as scheduled when decoding of the access units from an initial access unit in the access unit sequence.

Additionally, in an embodiment, a system for encoding of multimedia pictures is provided. The system includes a processing module and an encoding module. The processing module is configured to estimate an occupancy level of a CPB associated with a HRD at an instant of removal of an access unit corresponding to a multimedia picture from the CPB for decoding the access unit. The processing module is further configured to allocate a number of bits for encoding the multimedia picture based on the estimated occupancy level of the CPB. The encoding module is communicatively associated with the processing module and is configured to encode the multimedia picture based on the allocated number of bits.

Moreover, in an embodiment, a computer-readable medium is provided. The computer-readable medium is configured to store a set of instructions that when executed cause a computer to perform a method of encoding of multimedia pictures. The method includes estimating an occupancy level of a CPB associated with a HRD at an instant of removal of an access unit corresponding to a multimedia picture from the CPB for decoding the access unit. The method further includes allocating a number of bits for encoding the multimedia picture based on the estimated occupancy level of the CPB.

Other aspects and example embodiments are provided in the drawings and the detailed description that follows.

DETAILED DESCRIPTION

Pursuant to an exemplary scenario, during encoding, an encoder may compress multimedia pictures in an on-going manner and the generated compressed bit stream may be transmitted over a transmission channel to a decoder. The encoder may need to ensure that at any given point of time, the compressed bit stream is always contained wholly within a decoder buffer associated with the decoder. A buffer underflow (not enough bits in the decoder buffer for decoding a multimedia picture) will result in stalls during multimedia playback while a buffer overflow at the decoder buffer will result in loss of data. Variation in transmission channel capacities and a variation in decoder buffer sizes makes it difficult for the encoder to estimate the desired bit allocation for encoding multimedia pictures, such that the decoder buffer does not suffer from buffer underflow or buffer overflow. Various embodiments of the present technology, however, provide systems and methods for encoding of multimedia pictures that are capable of overcoming these and other obstacles and providing additional benefits.

The following description and accompanying figures demonstrate that the present technology may be practiced, or otherwise implemented, in a variety of different embodiments. It should be noted, however, that the scope of the present technology is not limited to any or all of the embodiments disclosed herein. Indeed, one or more of the devices, features, operations, processes, characteristics, or other qualities of a disclosed embodiment may be removed, replaced, supplemented, or changed.

Figure 1:
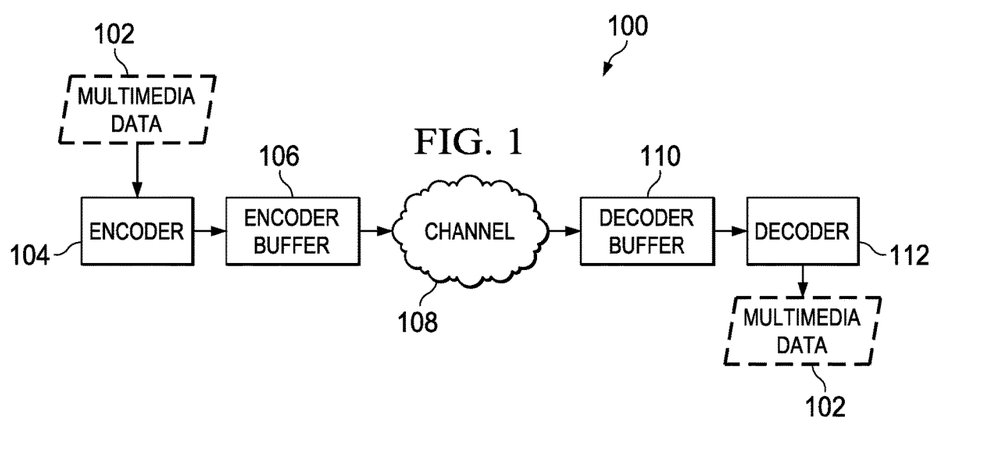
FIG. 1 illustrates an overview of process flow for encoding and decoding of multimedia pictures according to an exemplary scenario.

FIG. 1 illustrates a simplified overview of process flow 100 for encoding and decoding of multimedia data 102 according to an exemplary scenario. The multimedia data 102 may be compressed, for example by multimedia encoder (depicted in FIG. 1 and referred to hereinafter as an encoder) 104 so as to efficiently utilize a storage capacity during storage or a spectrum/bandwidth during a transmission. The encoder 104 may be configured within a multimedia system. Examples of the multimedia system may include, but are not limited to, (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers. Pursuant to an exemplary scenario, the encoder 104 may be any machine capable of executing a set of instructions (sequential and/or otherwise) so as to perform an encoding of multimedia data 102.

The multimedia data 102 may be received by the encoder 104 from a media capture device. Examples of the media capture device may include, but are not limited to, a video camera and a camcorder. The media capture device may be, for example, a stand-alone device or a part of a mobile device, such as, for example, a Smartphone, or a data processing device, such as, for example, a personal computer, a laptop device or a personal digital assistant (PDA). The multimedia data 102 may also be received by the encoder 104 from a transcoding system, which may be a stand-alone device or a part of a media capture device. Examples of multimedia data 102 may include, for example, video data, image data, audio-video data, graphical data, textual data or any combination thereof. Pursuant to an exemplary scenario, the multimedia data 102 may include a plurality of multimedia pictures, and each multimedia picture from among the plurality of multimedia pictures may include several blocks (also referred to as macroblocks) of data.

In an embodiment, the encoding of the multimedia data 102 may include performing at least one of motion estimation/compensation, transformation, quantization and entropy encoding of the plurality of multimedia pictures. During motion estimation/compensation, a prediction for each block from among a number of blocks of multimedia data 102 is determined and subtracted from the block so as to form residual multimedia data. The prediction for each block of multimedia data 102 may be performed based on previously encoded blocks of the multimedia data 102, either from a current picture (e.g., intra prediction) or from other pictures that have already been encoded and transmitted (e.g., inter prediction). Identifying a suitable prediction may be referred to, for example, as "motion estimation", and subtracting the prediction from the current block may be referred to, for example, as "motion compensation".

After motion estimation/compensation, the residual multimedia data may be transformed and quantized. The transformation of the residual multimedia data outputs a set of transform coefficients, each of which is a weighting value for a standard basis pattern. The weighted basis patterns, when combined, are capable of recreating the residual multimedia data. The set of transform coefficients are then quantized (such as where each coefficient is scaled corresponding to a scale-down factor which may be a mathematical reciprocal of the scale-up factor specified by a multimedia standard, thereby effectively setting a number of transform coefficients to a relatively small value (including a zero value)) so as to achieve compression. The quantized transform coefficients, along with certain information (such as, for example, information about the structure of compressed data, information about a complete sequence of multimedia data 102 and/or information that enables a decoder to re-create the prediction), are subject to entropy encoding (e.g., conversion into binary codes using variable length coding and/or arithmetic coding). The entropy encoding of the multimedia data 102 produces encoded multimedia data in form of a compact and binary representation of the information. Pursuant to an exemplary scenario, the encoded multimedia data may be in form of access units, where each access unit corresponds to one multimedia picture in an encoded form.

The encoder 104 may compress multimedia pictures in an on-going manner and the generated compressed bit stream (corresponding to the access units) may be stored in the encoder buffer 106. The transmission channel (referred to in FIG. 1 and hereinafter referred to as channel) 108 may be configured to transmit the bits corresponding to the access units from the encoder buffer 106 to the decoder buffer 110 at a bit rate that depends on the capacity of the channel 108. Examples of the channel 108 utilized for transmission of access units from the encoder buffer 106 to the decoder buffer 110 may include electrically conductive interfaces (for example, co-axial cables), optically conductive interfaces (for example, fiber optic channels), radio frequency interfaces (for example, cellular and non-cellular network channels) and the like.

The transmitted bits corresponding to the various access units are stored in the decoder buffer 110 till the decoder 112 removes the bits for decoding. Pursuant to an exemplary scenario, the decoder 112 may wait for a finite amount of time before removing the first access unit (for example corresponding to the first multimedia picture) from the decoder buffer 112. The removal of bits corresponding to the first access unit from the decoder buffer 112 for the purpose of decoding and the actual decoding may be instantaneous. Pursuant to an exemplary scenario, the bits corresponding to the access units may be transmitted over various types of channel 108, which may be associated with different transmission bit rates depending upon respective capacities. Further, the decoder 112 may reside on different variety of multimedia devices, such as mobile phones, music players, computing devices and the like, and hence may be associated with different capacities for decoder buffer 110. The encoder 104 may need to ensure that each access unit be allocated a number of bits, such that the bit stream corresponding to the various access units is contained wholly in the decoder buffer 110 and there is no buffer underflow (not enough bits in the decoder buffer 110 for decoding a multimedia picture) or buffer overflow (excess bits in the decoder buffer 110 than that can be accommodated in the decoder buffer 110) at the decoder buffer 110. An underflow at the decoder buffer 110 will result in stalls while playback of the bit stream and overflow at the decoder buffer 110 will result in loss of data.

For this purpose, video coding standards such as International Organization for Standardization/International Electrotechnical Commission (ISO/IEC) Moving Picture Experts Group-4 (MPEG-4) Part 10 Advanced Video Coding (AVC) Standard/ITU-TH.264 Recommendation (hereinafter referred to as the "MPEG-4 AVC Standard"), define a mathematical or hypothetical model of a decoder and specify a set of rules for successful handling of bit streams through it. The hypothetical model of a decoder is conceptually connected to the output of an encoding system, such as the encoder 104, and receives the bit stream (corresponding to the various access units) from the encoder buffer, such as the encoder buffer 106. Such a hypothetical model of a decoder is known as the hypothetical reference decoder (HRD) in H.263, H.264 and the video buffering verifier (VBV) in MPEG. The hypothetical model of a decoder and buffering verifier are hereinafter collectively referred to as hypothetical reference decoder (HRD).

The HRD specifies rules that bit streams generated by the encoder 104 must adhere to for such an encoder 104 to be considered conformant under a given standard or recommendation. A bit stream may be considered to be compliant if it can be decoded by the HRD without suffering from buffer overflow or buffer underflow. HRD parameters may be used to impose constraints on the encoded sizes of pictures and to assist in deciding the required buffer sizes and start-up delay. The HRD is described in FIG. 2.

Figure 2:
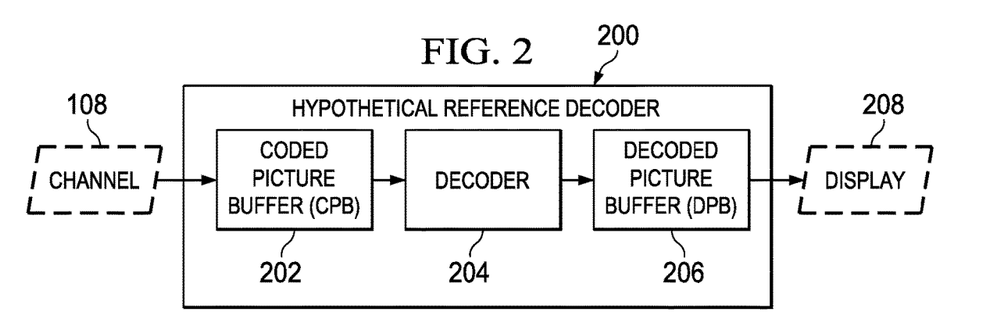
FIG. 2 illustrates a block diagram of hypothetical reference decoder (HRD) according to an exemplary scenario.

FIG. 2 illustrates a block diagram of HRD 200 according to an exemplary scenario. As explained in FIG. 1, the HRD, such as the HRD 200, is conceptually connected to the output of an encoder buffer, such as the encoder buffer 106 and is depicted to receive access units corresponding to encoded multimedia pictures over the channel 108. The HRD 200 is configured to model a performance of a decoder, such as the decoder 112, for enabling the encoder 104 to estimate how its selection of coding parameters might affect decoding performance. For example, the encoder 104 may be able to estimate whether its allocation of bits for encoding multimedia pictures may result in decoder buffer, such as the decoder buffer 110, to suffer from buffer underflow or buffer overflow. Once the encoder has encoded the multimedia pictures while satisfying performance requirements of the HRD per the H.264 standard, access units may be transmitted over the channel 108 to the decoder buffer 110.

In FIG. 2, the HRD 200 is depicted to include a coded picture buffer (hereinafter referred to as CPB) 202, a decoder 204 and a decoded picture buffer (hereinafter referred to as DPB) 206. The CPB 202 receives bits corresponding to various access units from the encoder, for example, over channel 108. The standard H.264 specifies a conformant bit stream configured by the encoder 104 such that the bit stream will not overflow or underflow the CPB 202. Configuring a bit stream in such a manner by the encoder 104, that the CPB 202 and the DPB 206 do not suffer from buffer overflow or buffer underflow, enables the encoder 104 to reasonably preclude decoder buffer (such as the decoder buffer 110) to suffer from buffer overflow or buffer underflow. The decoder 204 receives the access units from the CPB 202, decodes the access units instantaneously via a decode process, and forwards the decoded access units (i.e. multimedia pictures) to the DPB 206 for storage and subsequently display 208. A system for encoding of multimedia pictures is explained in FIG. 3.

Figure 3:
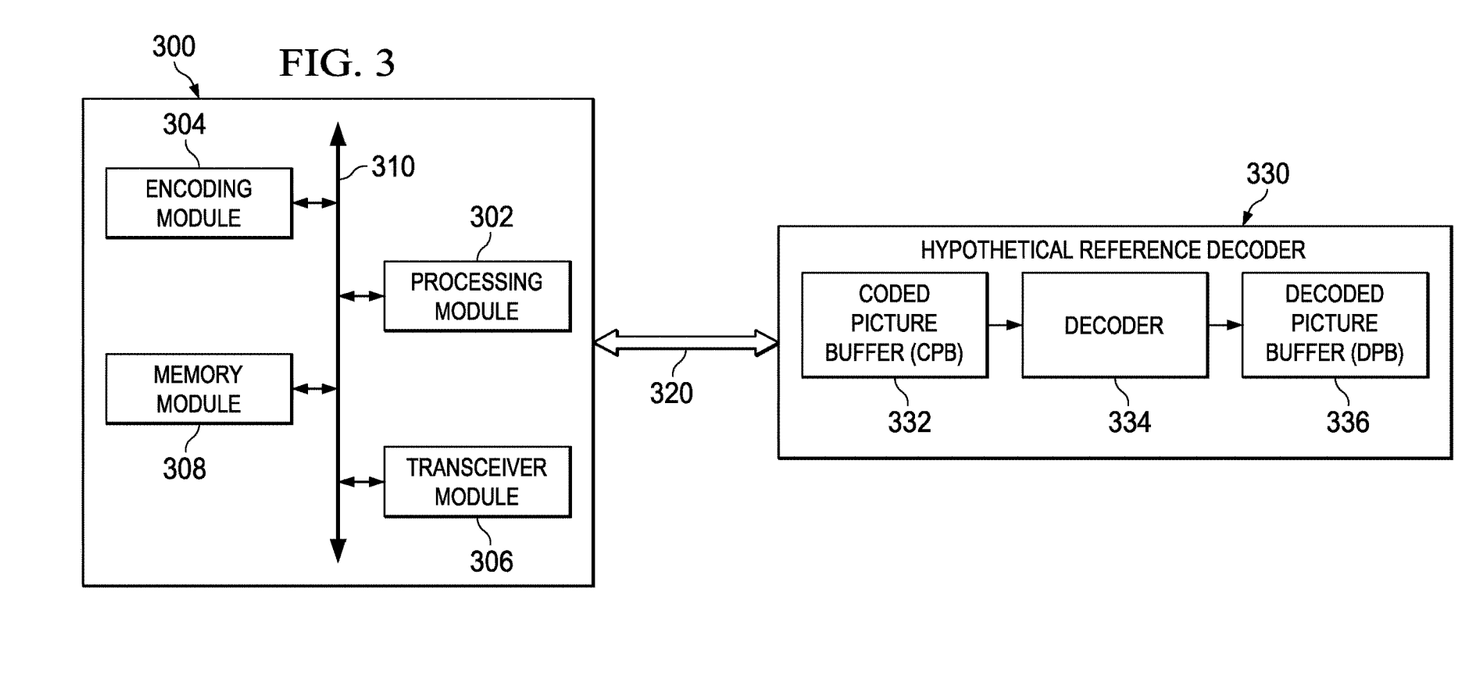
FIG. 3 is a block diagram of a system for encoding of multimedia pictures according to an embodiment.

FIG. 3 is a block diagram of a system 300 for encoding of multimedia pictures according to an embodiment. The multimedia pictures may include, for example, multimedia frames, fields, and the like. Furthermore, the multimedia pictures may be associated with various multimedia content types, such as, for example, progressive multimedia content, interlaced multimedia content, and the like. In an embodiment, the system 300 is configured to be included within a multimedia encoder, such as the encoder 104. In an exemplary embodiment, the system 300 may be configured within a personal computer (PC), a tablet PC, a personal digital assistant (PDA), a mobile communication device, a web appliance, a set-top box (STB), an embedded system and/or any machine capable of executing a set of instructions (sequential and/or otherwise) so as to perform encoding of multimedia pictures.

The system 300 includes a processing module 302, an encoding module 304, a transceiver module 306 and a memory module 308. In an embodiment, the processing module 302, the encoding module 304, the transceiver module 306 and/or the memory module 308 are configured to communicate with each other via or through a bus 310. Examples of the bus 310 may include, but are not limited to, a data bus, an address bus, a control bus, and the like. The bus 310 may be, for example, a serial bus, a bi-directional bus or a unidirectional bus. Examples of the memory module 308 may include, but are not limited to, random access memory (RAM), dual port RAM, synchronous dynamic RAM (SDRAM), double data rate SDRAM (DDR SDRAM), and the like. In an embodiment, the encoding module 304 may include one of an entropy encoder, as explained herein with reference to FIG. 1, and an encoder configured with the transformation/quantization and entropy encoding capabilities. In an example embodiment, an encoder buffer, such as the encoder buffer 106, may be embodied as the memory module 308.

In an embodiment, the transceiver module 306 may be configured to receive a plurality of multimedia pictures corresponding to multimedia data from a media capture device, such as camera. The camera may be a stand-alone device or may be a part of a multimedia processing device, such as a mobile phone, a music player, a computing device and the like. In an embodiment, the transceiver module 306 may receive the plurality of multimedia pictures corresponding to the multimedia data from an external storage location, such a remote server or a memory location in a multimedia processing device, configured to store multimedia data. The plurality of multimedia pictures received by the transceiver module 306 may be stored in the memory module 308.

The encoding module 304 in conjunction with the processing module 302 and the memory module 308 may encode the multimedia pictures in an on-going manner. The encoded multimedia pictures in form of access units may be configured to be transmitted, for example by the transceiver module 306, to a multimedia decoder for subsequent decoding and displaying purposes. A HRD 330 (such as HRD 200) may be utilized for modeling a performance of the decoder, such as the decoder 110, to prevent buffer underflow or buffer overflow at the decoder as explained in FIG. 2. Accordingly, the HRD 330 may be considered to be conceptually coupled to the system 300 (for example, over channel 320 which may be configured to mirror an affect of the channel 108 of FIG. 1) for estimating an effect of selecting of encoding parameters on the decoding of the multimedia pictures. The access units (for example, encoded multimedia pictures) may be transmitted to a CPB 332 (such as the CPB 202) associated with the HRD 330 to mirror the effect of transmitting the access units to the decoder buffer. The transmitted access units may be stored in the CPB 332. A decoder 334 (such as the decoder 204) may remove access units in an on-going manner from the CPB 332 for decoding purposes. As explained in FIG. 2, each access unit may correspond to one multimedia picture in an encoded form. The decoder 334 may be configured to remove an access unit from the CPB 332 when all bits corresponding to the access unit are received at the CPB 332. In an embodiment, the removal of an access unit from the CPB 332 and subsequent decoding may be performed instantaneously.

In an embodiment, the processing module 302 is configured to estimate an occupancy level of the CPB 332 associated with the HRD 330 at an instant of removal of an access unit corresponding to a multimedia picture from the CPB 332 for decoding the access unit. In an embodiment, the processing module 302 is configured to allocate a number of bits for encoding the multimedia picture based on the estimated occupancy level of the CPB 332. The determination of the occupancy level of the CPB 332 and the subsequent allocation of bits is explained with an illustrative example as follows:

Multimedia pictures corresponding to the multimedia data, numbered from 0 to N in the encoding sequence, may be encoded in an on-going manner to generate access units corresponding to the multimedia pictures and transmitted to the CPB 332 over the channel 320. An arrival of an access unit at the CPB 332 increases the occupancy level of the CPB 332 by a number of bits corresponding to a number of bits associated with the arrived access unit. Similarly, a removal of an access unit from the CPB 332 results in a drop in the occupancy level of the CPB 332 by a number of bits equal to the number of bits associated with the removed access unit. At the instant of removal of an access unit, for example access unit #10 (i.e., access unit corresponding to multimedia picture #10 in the encoding order), from the CPB 332 for decoding by the decoder 334, the occupancy level of the CPB 332 is estimated. If CPB 332 is estimated to be occupied up to 'X' number of bits (for example, on account of reception of plurality of access units corresponding to the multimedia pictures) at the instant of removal of access unit #10, then it is estimated that a space available in the CPB 332 is 'X' number of bits at the instant of removal of access unit #10. It is noted that the term "space available in the CPB" as used herein refers to a capacity of the CPB, such as the CPB 332, to contain bits corresponding to the multimedia picture. Accordingly, the access unit #10 may be allocated up to X number of bits as the CPB 332 may have accommodated up to X number of bits at the instant of removal of access unit #10 (as estimated by the occupancy level of the CPB 332) without suffering from buffer underflow. The buffer occupancy level of the CPB 332 is explained further in FIGS. 4 and 5.

In an embodiment, the processing module 302 is configured to maintain a track of an arrival time at the CPB 332 and a removal time from the CPB 332 for each access unit received at the CPB 332. In an embodiment, the occupancy level of the CPB 332 at a plurality of instances of time is estimated based on at least one of the track maintained of access units received at the CPB 332 and a transmission channel bit rate corresponding to the received access units at the CPB 332, such as a bit rate of the channel 320. For example, the processing module 302 may maintain a track of arrival time and removal time of access units #0 to N arrived at the CPB 332. The occupancy level of the CPB 332 at a plurality of instances of time, such as at an instant of arrival of access unit #5, may be estimated based on the track maintained of arrival times and removal times of access units received prior to the reception of the access unit #5 (for example, access units #0, 1, 2, 3 and 4) and a maximum bit rate of a transmission channel 320.

In an example embodiment, the channel 320 may model the transmission channel utilized for transmission of bits corresponding to the access unit from the system 300 to a decoder, such as the decoder 112. In an embodiment, the transmission channel bit rate is one of a constant bit rate (CBR) and a variable bit rate (VBR). A channel supporting a VBR transmission may be hereinafter referred to as a VBR channel, and, the channel supporting CBR transmission may be hereinafter referred to as a CBR channel. In case of VBR channels, the bits corresponding to the access units are not received at a constant rate and there may even be discontinuities (for example, zero bit rate) in bit transmission. A discontinuity may be observed, for example when the encoder buffer (embodied as memory module 308) is empty with respect to bits to transmit for decoding purposes. The system 300 may need to account for the discontinuities in the transmission through VBR channels to ensure that the generated bit stream is contained in the CPB 332. By maintaining a track of arrival times and removal times of access units, a behavior of the VBR channel to zero out the channel bit rate is factored in, and the processing module 302 may estimate the occupancy level of the CPB 332 at any causal point of time. Accordingly, the HRD 330 may be modeled by the processing module 302 at its end in units of absolute time as opposed to tracking the occupancy level of the HRD 330 in units of bits, enabling tighter control in terms of allocation of bits for encoding purposes.

In an example embodiment, the encoding module 304 is configured to encode the multimedia picture based on the allocated number of bits. In an example embodiment, the encoding module 304 may dynamically select a quantization parameter based on the allocated number of bits for encoding the multimedia picture to generate the access unit comprising a number of bits equal to the allocated number of bits.

In an example embodiment, the processing module 302 is configured to estimate an upper limit on the number of bits configured to be allocated for encoding the multimedia picture for estimating the occupancy level of the CPB 332. In an embodiment, the upper limit may be estimated for preventing an occurrence of buffer underflow at the CPB 332. The buffer underflow at the CPB 332 occurs when a time of arrival of a last bit of access unit # n is greater than a nominal removal time of the access unit # n. In an embodiment, the nominal removal time, as referred to herein, may correspond to a time instant at which the access unit # n is configured to be removed from the CPB 332. More specifically, all bits corresponding to an access unit must have arrived at the CPB 332 prior to a time of removal of the corresponding access unit from the CPB 332. If all the bits corresponding to the access unit are not received at the CPB 332 prior to a time of removal of the access unit, then the decoder 334 would have to wait till all the bits are received resulting in an buffer underflow (e.g., not enough bits in the CPB 332 to initiate decoding of the access unit). Accordingly, to prevent buffer underflow at the CPB 332, the nominal removal time of the access unit # n must be greater or equal to the time of arrival of the last bit of access unit # n, which is mathematically expressed in the following equation (1):

$$t_{af}(n) <= t_{rn}(n) \qquad (1)$$

wherein, $t_{rn}(n)$ is a nominal removal time of $n^{th}$ access unit from the CPB 332, $t_{af}(n)$ is a time of arrival of last bit of $n^{th}$ access unit at CPB 332. Equation (1) implies that all bits corresponding to an access unit # n are to be available at CPB 332 at the time of removal of the access unit # n. However, the final arrival time of the access unit # n may be obtained from the arrival time of the access unit # n and a bit rate of the associated transmission channel. Accordingly, the final arrival time is expressed in the following equation (2):

$$t_{af}(n) = t_{ai}(n) + b(n)/R \qquad (2)$$

wherein, $t_{af}(n)$ is a time of arrival time of last bit of $n^{th}$ access unit at CPB 332, $t_{ai}(n)$ is a time of arrival of first bit of $n^{th}$ access unit at CPB 332, b(n) is a number of bits to be allocated for encoding the $n^{th}$ multimedia picture, and R is a maximum bit rate of a transmission channel, such as channel 320.

From equations (1) and Eq. (2), an upper limit on the number of bits configured to be allocated for encoding the multimedia picture for preventing an occurrence of buffer underflow at the CPB 332 may be estimated as:

$$b(n) <= ((t_{rn}(n) - t_{ai}(n))*R) \qquad (3)$$

wherein, b(n) is number of bits allocated for encoding the $n^{th}$ multimedia picture, $t_{rn}(n)$ is nominal removal time of $n^{th}$ access unit from the CPB 332, $t_{ai}(n)$ is a time of arrival of first bit of $n^{th}$ access unit at CPB 332, and R is a maximum transmission channel bit rate corresponding to the received access units at the CPB 332.

The processing module 302 derives a tight upper limit on a number of bits that can be consumed for encoding the multimedia picture based on equation (3). The encoding module 304 may be configured to ensure that the estimated upper limit is respected for every multimedia picture it encodes such that buffer underflow at the CPB 332 is precluded. In an example embodiment, the upper limit may vary from one multimedia picture to another.

In an embodiment, the occupancy level of the CPB 322 is estimated based on the upper limit estimated as explained in equation (3). It is noted that an exact space available at the time of removal of an access unit depends on a number of bits consumed by access units that immediately follow the current access unit. Accordingly, allocating a number of bits for encoding a multimedia picture in case of VBR channels may be difficult as the exact space (in units of bits) in the CPB 322 available at the time of removal of an access unit corresponding to the multimedia picture is not known with desired accuracy on account of non-causality of conditions involved. Accordingly, an optimistic estimate of the occupancy level of the CPB 322 may be estimated based on the upper limit. For example, if the maximum bit rate R is 4000 bits/sec and if the nominal removal time for the access unit #0 is 1 sec and the initial arrival time for access unit #0 is 0 sec, then based on equation (3) the upper limit b(0) for allocating bits to the access unit #0 is:

$$b(0) <= (1-0)*4000 = 4000 \text{ bits} \qquad (4)$$

Similarly, if the maximum bit rate R is 4000 bits/sec and if the nominal removal time for access units #1 and 2 are 1.25 sec and 1.50 sec, respectively, and wherein the initial arrival times for access units #1 and 2 are 0.75 sec and 1.00 sec, respectively, then the upper limits, b(1) and b(2), for allocating bits to the access units #1 and 2 are:

$$b(1) = (1.25 - 0.75)*4000 = 2000 \text{ bits} \qquad (5)$$

$$b(2) = (1.50 - 1.00)*4000 = 2000 \text{ bits} \qquad (6)$$

It is noted that the upper limits as obtained in equations 4, 5 and 6 constitute a most optimistic estimate of the occupancy level of the CPB 322. Accordingly, based on the upper limit estimated for allocating bits, the encoding module 304 may allocate bits up to 4000 bits for access unit #0, and up to 2000 bits for access units #1 and 2. It is noted that the occupancy level of the CPB 322 may not correspond to 4000 bits for access unit #0 and 2000 bits for access units #1 and 2, at the instant of removal of the respective access units, however, the upper limit provides an indication of the maximum occupancy level possible at the corresponding instants of removal and allocating bits based on the estimated upper limits may enable preventing an occurrence of buffer underflow at the CPB 322. Accordingly, the encoding module 304 may allocate, for example, 3000 bits for access unit #0 and 1000 bits each for access units #1 and 2, respectively.

In an embodiment, a number of bits may be allocated for encoding the multimedia picture based on the estimated occupancy level. In an embodiment, the encoding module 304 is configured to dynamically select a quantization parameter (QP) value based on the allocated number of bits for encoding macroblocks associated with the multimedia picture. If it is determined based on the occupancy level at the CPB 332, that there is space available for allocating sizable number of bits, then the encoding module 304 may select a low value of QP, such that encoding of the multimedia picture could potentially take more bits than those allocated for recently encoded multimedia picture. However, if it is determined there is little space available for allocating number of bits then the encoding module 304 may select a higher value of QP, such that encoding of the multimedia picture could potentially take lesser number of bits than those allocated for the recently encoded multimedia picture.

In an embodiment, the processing module 302 is configured to determine a maximum multimedia picture size for encoding the multimedia picture. In an embodiment, the maximum multimedia picture size may be determined based on the estimated upper limit on the number of bits. In an embodiment, the maximum multimedia picture size may be determined based on system requirements. In an embodiment, the multimedia picture size may be defined in unit of bits. For example, the maximum multimedia picture size may be determined to be "M" number of bits. In an embodiment, the processing module 302 tracks a number of bits consumed during encoding of macroblocks corresponding to the multimedia picture. In an embodiment, the encoding module 304 may be configured to increase a QP value up to a pre-defined maximum QP value for encoding of remaining macroblocks corresponding to the multimedia picture if a number of bits associated with the maximum multimedia picture size is likely to be exceeded during encoding of the macroblocks. In an embodiment, the QP value may be increased up to a maximum QP value specified by a video-coding standard. In an embodiment, the maximum QP value may be configured to be 51. In an embodiment, skip-macroblock encoding of remaining macroblocks corresponding to the multimedia picture may be performed if the number of bits associated with the maximum multimedia picture size is likely to be exceeded during encoding of the remaining macroblocks based on the pre-defined maximum quantization parameter value. More specifically, based on the allocated number of bits by the processing module 302, the encoding module 304 initiates encoding of macroblocks corresponding to the multimedia picture. During encoding of the macroblocks, the processing module 302 continuously keeps track of a number of bits that are being consumed and checks whether a number of bits (for example, M number of bits) associated with the maximum multimedia picture size is being exceeded. If the maximum multimedia picture size is likely to be exceeded (for example, when encoding macroblocks corresponding to only half of the multimedia picture is about to exhaust the allocated number of bits), then the encoding module 304 may increase the QP value to reduce a number of bits to encode the remaining macroblocks (for meeting the target of allocated number of bits). The QP value may be increased up to a maximum QP value (for example, a QP value of 51) for encoding of the remaining macroblocks. Performing encoding in such a manner ensures best effort compression under 'close-to-underflow' situation.

In an embodiment, in spite of encoding the remaining macroblocks based on the maximum QP value to restrict the number of bits being consumed during encoding of the macroblocks, if a number of bits consumed may still exceed M, then portions of the multimedia picture (for example, in form of macroblocks corresponding to the multimedia picture) may be skipped during encoding. For example, a partial-picture skip may be performed to meet the target allocated number of bits while ensuring that M number of bits is not exceeded.

In an embodiment, the processing module 302 is configured to transmit buffering period supplemental encoder information (SEI) at pre-defined intervals to the CPB 332 for facilitating decoding of access units received at the CPB 332 from an intermediate access unit in a corresponding access unit sequence. In an embodiment, the buffering period SEI comprises an initial removal delay for access units programmed to match corresponding instances of removal as initially scheduled when decoding of the access units from an initial access unit in the access unit sequence.

It is noted that SEI, as provided in video coding standards may contain "Buffering period" messages and "Picture timing" messages for each schedule. More specifically still, the Buffering period messages may specify initial CPB removal delays (referred to herein as initial removal delay) both at the beginning of the video content and at random access points within the video content, while the Picture timing messages may specify CPB removal delay and DPB removal delay on a per picture basis. In an example embodiment, in case of decoder 334 initiating decoding from beginning of the access unit sequence (corresponding to sequence of multimedia pictures in the encoding order), the time difference, $[t_{rn}(n)-t_{af}(n-1)]$, denotes the time for which the 'n'th access unit remains in the CPB 202. If entire access unit sequence (for example, access units #0 to N) is fully compliant to the HRD 330, then even if the decoder 324 starts decoding from the intermediate access unit in the access unit sequence, the bit-stream corresponding to the access unit subsequence will still be compliant to the HRD 330 if the initial removal delay is exactly same as the amount of time for which the access unit would have stayed in the CPB 332 if the decoding was initiated from the beginning of access unit sequence. For example, if a bit stream corresponding to sequence of access units #0, 1, 2, 999 is fully compliant to the HRD 330, then a bit-stream corresponding to the access unit subsequence comprising last 300 access units (for example access units #700, 701, 702 . . . 999) is compliant to the HRD 330, if the access unit #700 is present in the CPB 332 for same amount of time if the decoding was initiated from the beginning of access unit sequence (for example, access unit #0). More specifically, decoding from intermediate access units from among an access unit sequence may be facilitated while maintaining compliance to the HRD 330 if initial removal delay for start of decoding the access unit subsequence 700, 701, . . . 999 computed as $[t_{rn}(700)-taf(699)]$ is equal to removal delay as initially scheduled for decoding original sequence of 1000 frames. In an example embodiment, the initial removal delay is programmed based on the following equation (7):

$$\text{initial removal delay} = 90000 \times [t_{rn}(n) - t_{af}(n-1)] \quad (7)$$

wherein, $t_{rn}(n)$ is a nominal removal time of $n^{th}$ access unit from the CPB, and $t_{af}(n-1)$ is a time of arrival of a last bit of the $(n-1)^{th}$ access unit at CPB.

In an embodiment, the system 300 may additionally include other components (not shown), such as, for example, an input unit (e.g., key board, touch screen and the like), a video display unit (e.g., a liquid crystals display (LCD), a cathode ray tube (CRT), and the like), a cursor control device (e.g., a mouse), a drive unit (e.g., a disk drive), a signal generation unit (e.g., a speaker) and/or a network interface unit. The drive unit may include a machine-readable medium upon which is stored one or more sets of instructions (e.g., software) embodying one or more of the methodologies and/or functions described herein. In an embodiment, the software resides, either completely or partially, within the memory module 308 and/or the processing module 302, and/or within the encoding module 304, during the execution thereof by the system 300 such that the processing module 302, the encoding module 304 and/or the memory module 308 also constitutes machine-readable media.

The software may further be transmitted and/or received over a network via or through the network interface unit. The term "machine-readable medium" may be construed to include a single medium and/or multiple media (e.g., a centralized and/or distributed database, and/or associated caches and servers) that store the one or more sets of instructions. Moreover, the term "machine-readable medium" may be construed to include any medium that is capable of storing, encoding and/or carrying a set of instructions that may be executed by the system 300 such that the execution of these instructions causes the system 300 to perform one or more of the methodologies of the various embodiments. Furthermore, the term "machine-readable medium" may be construed to include, but shall not be limited to, solid-state memories, optical and magnetic media, and carrier wave signals.

Figure 4:
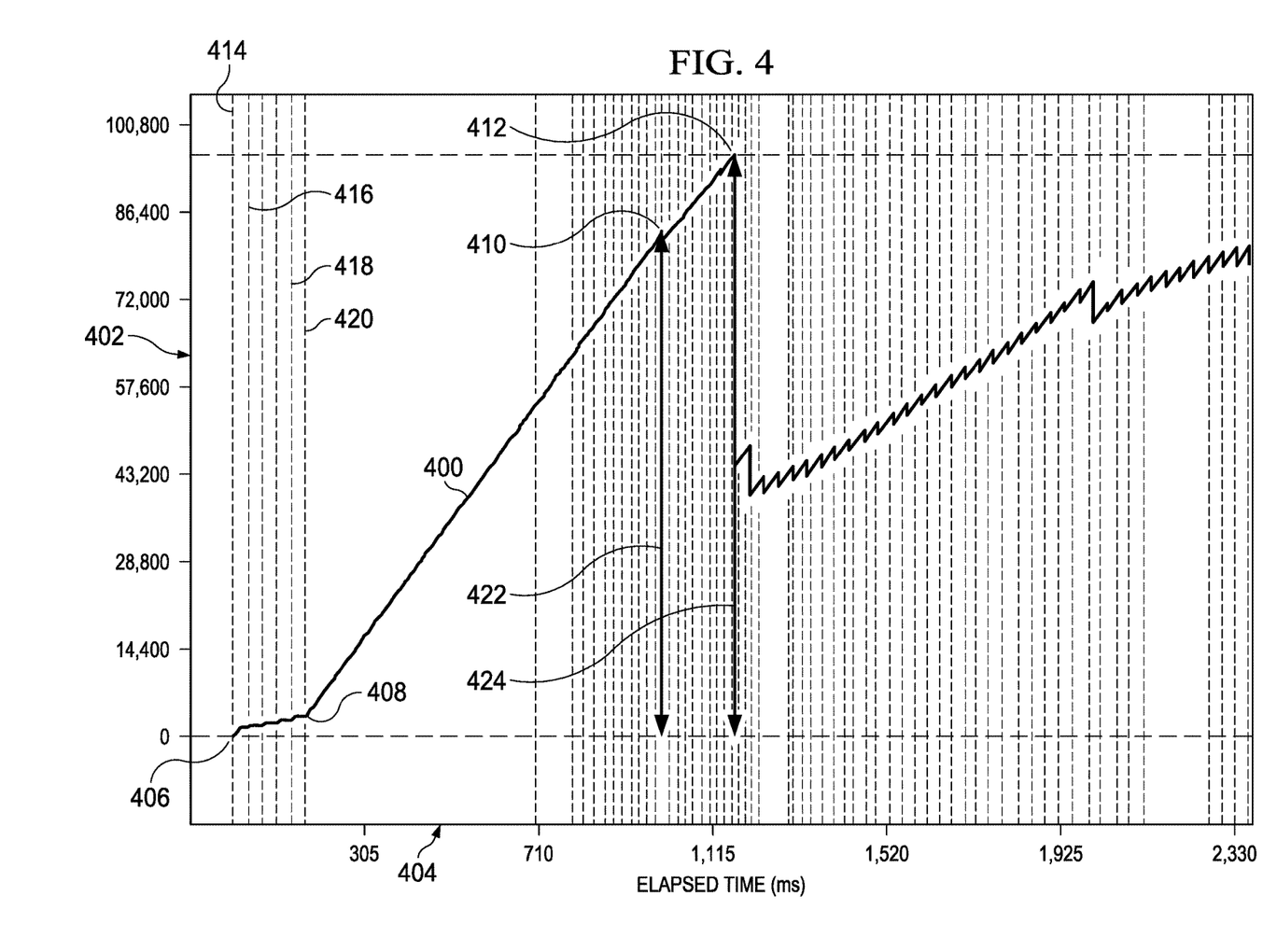
FIG. 4 illustrates a plot depicting variation in occupancy level of coded picture buffer at various instances of time, according to an embodiment.

FIG. 4 illustrates a plot 400 depicting variation in occupancy level of a coded picture buffer, such as the CPB 332 of FIG. 3, at various instances of time according to an embodiment. The occupancy level of the CPB is measured in terms of bits and is plotted on the Y-axis 402 and the corresponding time instances are plotted on the X-axis 404. The plot (or trace) 400 corresponds to variation in a number of bits occupying the CPB at different instances of time. For purposes of illustration, the following exemplary values of number of bits are listed along the Y-axis 402: 0, 14400, 28800, 43200, 57600, 72000, 86400 and 100800. Additionally, for purposes of illustration, the following exemplary values of elapsed time in milliseconds are listed along the X-axis 404: 305, 710, 1115, 1520, 1925 and 2330.

As explained in FIG. 3, access units corresponding to encoded multimedia pictures may be received by the CPB subsequent to encoding of the multimedia pictures. The bits corresponding to the various access units may be modeled as transmitted (over a transmission channel, such as channel 108) at a constant bit rate (CBR) or a variable bit rate (VBR) to the CPB. The plot 400 corresponds to VBR transmission of bits corresponding to the various access units. An arrival of an access unit increases the number of bits occupying the CPB by an amount equivalent to a number of bits associated with the recently arrived access unit. For example, a first bit of access unit corresponding to multimedia picture #0 (or access unit #0) is depicted to be received at the CPB at instant 406. Similarly, a first bit of access unit #5 is depicted to be received at the CPB at instant 408. A removal of an access unit from the CPB decreases the number of bits occupying the CPB by an amount equivalent to a number of bits associated with the recently removed access unit. For example, the access unit #0 and access unit #5 are depicted to be removed at instants 410 and 412 respectively. Accordingly, an increase in the number of bits occupying the CPB with time as depicted in the plot 400 in FIG. 4 signifies an arrival of an access unit, whereas a decrease in the number of bits occupying the CPB in the plot 400 signifies a removal of an access unit. It is noted that the decrease in the number of bits is indicated by fairly vertical drop (for example, not varying with time) in the plot 400 as generally the removal of bits by a decoder, such as the decoder 334 and subsequent initiation of decoding is performed instantaneously.

The vertical lines FIG. 4 signify access unit boundaries. For example, the access unit #0 may be understood to be received, as depicted by portion of the plot 400, between vertical lines 414 and 416. Similarly, the access unit #4 may be understood to be received, as depicted by portion of the plot 400, between vertical lines 418 and 420. Thus, the vertical lines serve to indicate access unit boundaries, where an intersection of the plot 400 and a vertical line may serve to indicate an arrival (or removal) of a first bit (or last bit) of an access unit, and the intersection of the plot 400 and subsequent vertical line may serve to indicate an arrival (or removal) of a first bit (or last bit) of a subsequent access unit.

As can be seen in FIG. 4, in case of VBR channel transmission, the bits corresponding to the access units are not received in a continuous manner by the CPB. In FIG. 4, this is noticed as breaks in ramps between arrival instants of access unit corresponding to access unit #0 all the way through arrival instant of access unit #5. The break in ramps is observed whenever an encoder buffer is empty and has no bits to transmit. An encoder (for example, encoding module 304) must control the bit rate to account for these discontinuities in the transmission through VBR channels to ensure that the generated bit stream generated is contained in the CPB.

In FIG. 4, the removal instants of access unit #0 and access unit #5 (among removal of other access units) are highlighted for illustrative purpose. At the instant 410 corresponding to removal of access unit #0, an occupancy level of the CPB is estimated (in terms of a number of bits). The occupancy level at the instant of removal of access unit 0 provides an indication of space available 422 (in units of bits) for allocating number of bits for encoding multimedia picture corresponding to access unit #0. More specifically, if access unit #0 would have been allocated a number of bits corresponding to the space available 422 then a drop in occupancy level of CPB to the extent of the space available 422 may have been accommodated without the CPB suffering from buffer underflow. Similarly, at the instant 412 corresponding to removal of access unit #5, an occupancy level of the CPB is determined (in terms of a number of bits). The occupancy level at the instant of removal of access unit #0 provides an indication of space available 424 for allocating number of bits for encoding multimedia picture corresponding to access unit #5.

As explained, allocating a number of bits for encoding a multimedia picture in case of VBR channels may be difficult as an exact space (in units of bits) available at the time of removal of an access unit corresponding to the multimedia picture is not known with desired accuracy. By maintaining a track of arrival times and removal times of access units, a behavior of the VBR channel to zero out the channel bit rate when the encoder buffer becomes empty is factored in, and the occupancy level of the CPB may be determined at any causal point of time. However, the occupancy level of the CPB at a later instant of time, for example at an instant of removal of an access unit may be estimated as explained in equation (3), which provides an indication of maximum occupancy level of the CPB while preventing an buffer underflow at the CPB.

Based on the estimated occupancy level of the CPB, a number of bits to be allocated for encoding multimedia pictures may be determined as explained in FIG. 3. The availability of space in the CPB and the determination of the occupancy level is further explained in FIG. 5.

Figure 5:
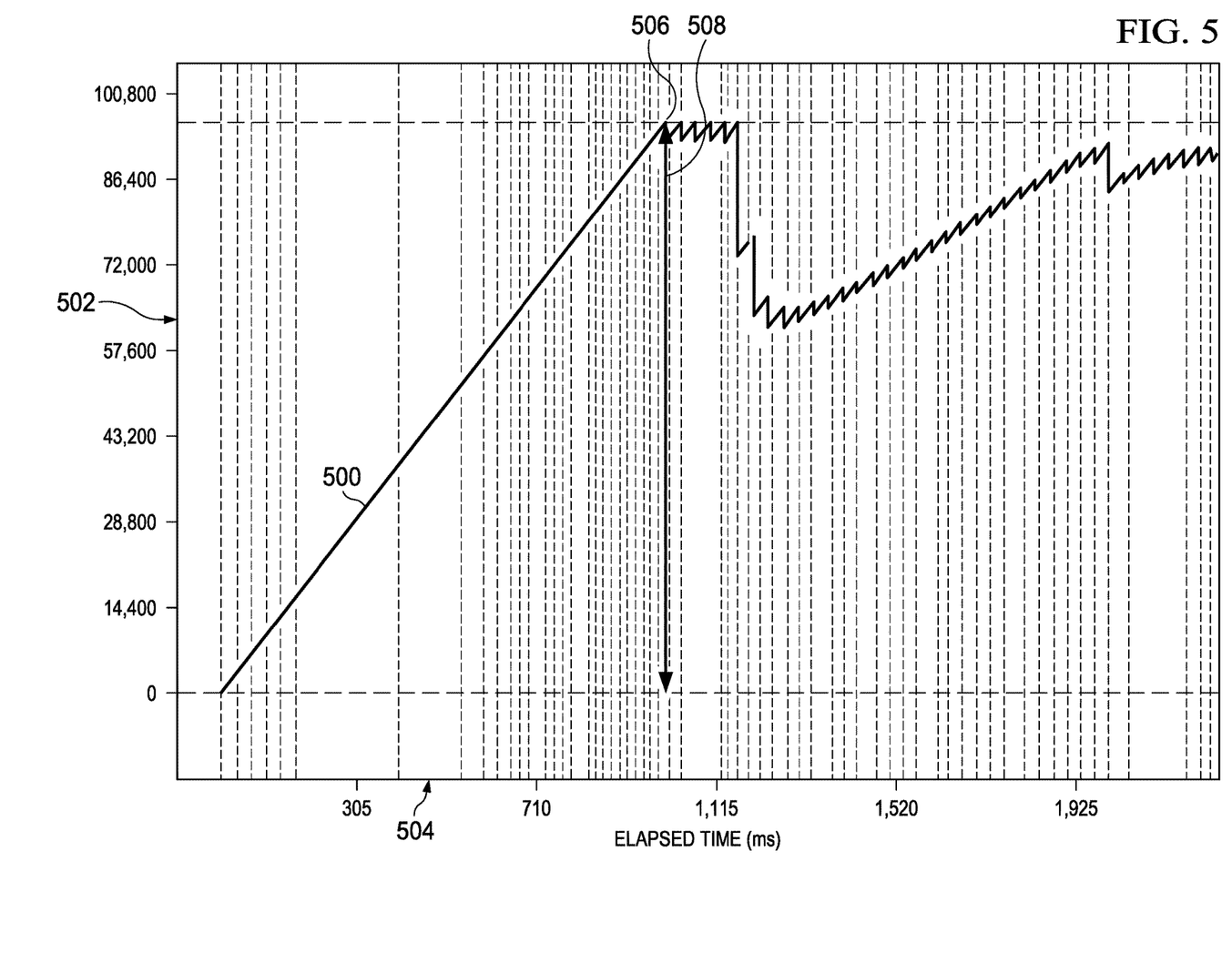
FIG. 5 illustrates a plot depicting variation in occupancy level of coded picture buffer at various instances of time, according to another embodiment.

FIG. 5 illustrates a plot 500 depicting variation in occupancy level of a CPB, such as the CPB 332 of FIG. 3, at various instances of time according to another embodiment. The plot 500 is similar to plot 400 of FIG. 4, as in, it corresponds to variation in a number of bits occupying the CPB (plotted on Y-axis 502) with time (plotted on X-axis

504). The plot 500 corresponds to VBR transmission of bits corresponding to the various access units over a transmission channel. As explained in FIG. 4, an arrival (or removal) of an access unit increases (or decreases) a number of bits occupying the CPB by an amount equivalent to a number of bits associated with the recently arrived (or removed) access unit. For purposes of illustration, the following exemplary values of number of bits are listed along the Y-axis 502: 0, 14400, 28800, 43200, 57600, 72000, 86400 and 100800. Additionally, for purposes of illustration, the following exemplary values of elapsed time in milliseconds are listed along the X-axis 504: 305, 710, 1115, 1520, 1925 and 2330. Further, the vertical lines FIG. 5 signify access unit boundaries (as explained in FIG. 4).

In FIG. 5, the removal instant of access unit 0 (among removal of other access units) is highlighted for illustrative purpose. At the instant 506 corresponding to the removal of access unit #0, an occupancy level of the CPB is determined (in terms of a number of bits). The occupancy level at the instant 506 of removal of access unit #0 provides an indication of space available 508 for allocating number of bits for encoding multimedia picture corresponding to access unit #0. As explained in FIG. 4, allocating a number of bits for encoding a multimedia picture in case of VBR channels may be difficult as that the exact space (in units of bits) available at the time of removal of access unit corresponding to the multimedia picture is not known with desired accuracy. The exact space available at the time of removal depends on the bits consumed by access units that immediately follow the current access unit. This is evident from FIG. 4, where the bits consumed by access units #1, 2, 3 and 4 is lesser than the bits consumed by same access units in case of FIG. 5. As a result, the space available 422 (as depicted in FIG. 4) for encoding multimedia picture corresponding to access unit #0 (i.e. access unit preceding the access units #1, 2, 3 and 4) in smaller than space available 508 for encoding multimedia picture corresponding to access unit #0 in FIG. 5. Based on the determined occupancy level of the CPB, a number of bits to be allocated for encoding multimedia pictures may be determined as explained in FIG. 3. A method for encoding of multimedia pictures is explained in FIG. 6.

Figure 6:
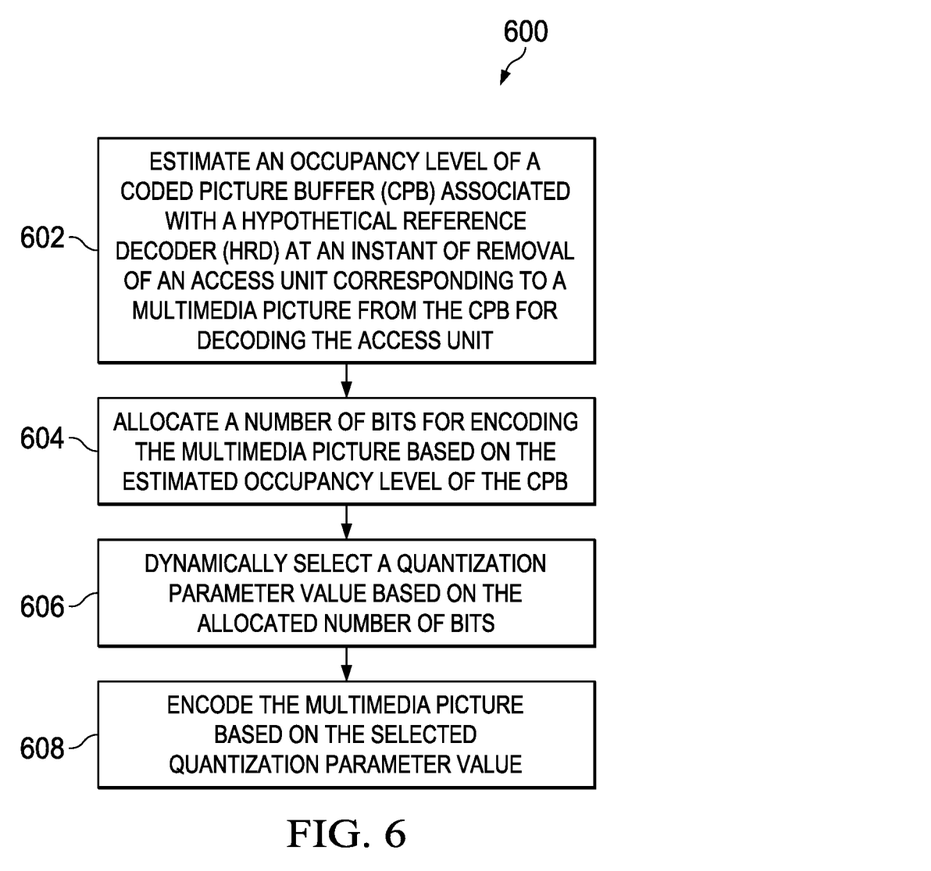
FIG. 6 is a flow diagram of a method of encoding of multimedia pictures, according to an embodiment.

FIG. 6 is a flow diagram of a method 600 for encoding of multimedia pictures according to an embodiment. Examples of the multimedia pictures may include, for example, multimedia frames, multimedia fields, and the like. The multimedia pictures may be associated with, for example, a progressive multimedia content, an interlaced multimedia content, and the like. The method 600 depicted in flow diagram may be executed by, for example, the system 300 of FIG. 3. Operations of the flowchart, and combinations of operation in the flowchart, may be implemented by various means, such as hardware, firmware, processor, circuitry and/or other device associated with execution of software including one or more computer program instructions. The operations of the method 600 are described with help of the system 300. However, the operations of the method can be described and/or practiced by using any other system. The method 600 starts at operation 602.

At operation 602, an occupancy level of a coded picture buffer (CPB), such as CPB 332, associated with a hypothetical reference decoder (HRD), such as HRD 330, is estimated (e.g., using processing module 302 of FIG. 3) at an instant of removal of an access unit associated with a multimedia picture from the CPB for decoding the access unit. As explained in FIGS. 4 and 5, an occupancy level of the CPB may be estimated at the instant of removal of the access unit to identify a space available in the CPB for determining allocation of a number of bits for encoding the multimedia picture corresponding to the access unit. In an embodiment, the occupancy level of the CPB is estimated based on an upper limit for bit allocation estimated as explained in equation (3). In an embodiment, the upper limit on a number of bits configured to be allocated for encoding the multimedia picture may be estimated for preventing an occurrence of buffer underflow at the CPB. As explained in FIG. 3, the buffer underflow at the CPB occurs when a time of arrival of a last bit of access unit # n is greater than the nominal removal time of the access unit # n. More specifically, all bits corresponding to an access unit must have arrived at the CPB prior to a time of removal of the corresponding access unit from the CPB. If all the bits corresponding to the access unit are not received at the CPB prior to a time of removal of the access unit, then a decoder, such as the decoder 334, would have to wait till all the bits are received resulting in an buffer underflow situation (e.g., not enough bits in the CPB to initiate decoding of the access unit).

It is noted that an exact space available at the time of removal of an access unit depends on a number of bits consumed by access units that immediately follow the current access unit. Accordingly, allocating a number of bits for encoding a multimedia picture in case of VBR channels may be difficult as the exact space (in units of bits) in the CPB available at the time of removal of an access unit corresponding to the multimedia picture is not known with desired accuracy on account of non-causality of conditions involved. Accordingly, an optimistic estimate of the occupancy level of the CPB may be determined based on the upper limit. It is noted that the occupancy level of the CPB may not correspond to the estimated upper limit at the instant of removal of the respective access units, however, the upper limit provides an indication of the maximum occupancy level possible at the corresponding instants of removal and allocating bits based on the estimated upper limits may enable preventing an occurrence of buffer underflow at the CPB. If the estimated upper limit is respected for every multimedia picture that is encoded, then the buffer underflow at the CPB may be precluded. In an example embodiment, the upper limit may vary from one multimedia picture to another.

In an embodiment, a track of an arrival time at the CPB and a removal time from the CPB for each access unit received at the CPB is maintained. In an embodiment, the occupancy level of the CPB at a plurality of instances of time is estimated based on at least one of the track maintained of access units received at the CPB and a transmission channel bit rate corresponding to the received access units at the CPB. As explained in FIG. 3, discontinuities in the transmission through VBR channels may need to be accounted for to ensure that the generated bit stream is contained in the CPB. By maintaining a track of arrival times and removal times of access units, a behavior of the VBR channel to zero out the channel bit rate is factored in, and the occupancy level of the CPB may be estimated at any causal point of time. Accordingly, a HRD, such as the HRD 330, may be modeled in units of absolute time as opposed to tracking the occupancy level of the HRD in units of bits, enabling tighter control in terms of allocation of bits for encoding purposes.

At operation 604, a number of bits is allocated (e.g., using processing module 302 of FIG. 3) for encoding the multimedia picture based on the estimated occupancy level of the CPB. For example, if the upper limit for encoding a multimedia picture is estimated to be 4000 bits implying a maximum occupancy level of the CPB at the instant of removal of the corresponding access unit, then any number of bits up to 4000 bits (for example, 3000 bits) may be allocated for encoding the multimedia picture without suffering from buffer underflow to be 4000 bits.

At operation 606, a QP value may be dynamically selected (e.g., using encoding module 304 of FIG. 3) for encoding the multimedia picture based on the allocated number of bits. If it is determined based on the occupancy level at the CPB, that there is space available for allocating sizable number of bits, then a low value of QP may be selected, such that encoding of the multimedia picture could potentially take more bits than those allocated for recently encoded multimedia picture. However, if it is determined there is little space available for allocating number of bits, a higher value of QP may be selected, such that encoding of the multimedia picture could potentially take lesser number of bits than those allocated for the recently encoded multimedia picture. At operation 608, the multimedia picture may be encoded (e.g., using encoding module 304 of FIG. 3) based on the selected quantization parameter value. The encoded multimedia pictures in form of access units may subsequently be transmitted over a transmission channel to a decoder for decoding purposes. Another method 700 for encoding of multimedia pictures is explained in FIG. 7.

Figure 7:
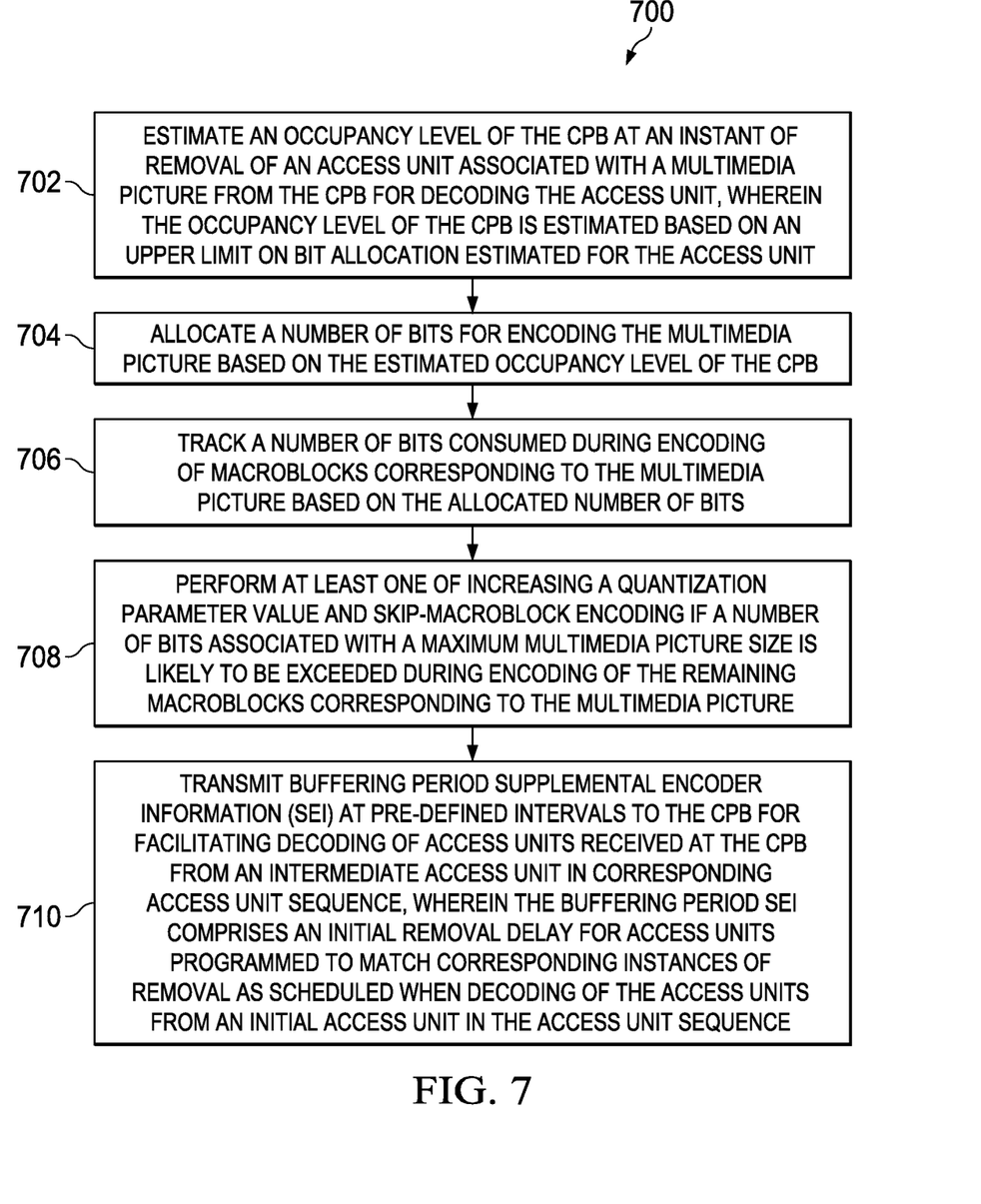
FIG. 7 is a flow diagram of a method for facilitating HRD compliance in a multimedia encoder, according to an embodiment.

FIG. 7 is a flow diagram of a method 700 for facilitating HRD compliance in a multimedia encoder, such as encoder 104, according to an embodiment. The method 700 depicted in flow diagram may be executed by, for example, the system 300 of FIG. 3. Operations of the flowchart, and combinations of operation in the flowchart, may be implemented by various means, such as hardware, firmware, processor, circuitry and/or other device associated with execution of software including one or more computer program instructions. The operations of the method 700 are described with help of the system 300. However, the operations of the method can be described and/or practiced by using any other system. The method 700 starts at operation 702.

At operation 702 of method 700, an occupancy level of the CPB is estimated (e.g., using processing module 302 of FIG. 3) at an instant of removal of an access unit associated with a multimedia picture from the CPB for decoding the multimedia picture. In an embodiment, the occupancy level of the CPB is estimated based on an upper limit on bit allocation estimated for the access unit. An estimation of the upper limit may be performed based on equation (3) as explained in FIG. 3

At operation 704, a number of bits are allocated for encoding the multimedia picture based on determined occupancy level of the CPB. In an embodiment, the allocated number of bits is less than or equal to an estimated upper limit for bit allocation. The allocation of bits may be performed as explained at operation 604 in FIG. 6. In an embodiment, a maximum multimedia picture size for encoding the multimedia picture is determined based on the estimated upper limit on the number of bits. In an embodiment, the maximum multimedia picture size may be determined based on the estimated upper limit on the number of bits. In an embodiment, the maximum multimedia picture size may be determined based on system requirements. In an embodiment, the multimedia picture size may be defined in unit of bits. For example, the maximum multimedia picture size may be determined to be "M" number of bits.

At operation 706, a number of bits consumed during encoding of macroblocks corresponding to the multimedia picture is tracked (e.g. using processing module 302). At operation 708, at least one of increasing a quantization parameter value and skip-macroblock encoding is performed (e.g., using encoding module 304 of FIG. 3) if a number of bits associated with a maximum multimedia picture size is likely to be exceeded during encoding of the macroblocks corresponding to the multimedia picture. In an embodiment, a QP value may be increased (e.g., using encoding module 304 of FIG. 3) up to a pre-defined maximum QP value for encoding of remaining macroblocks corresponding to the multimedia picture if a number of bits associated with the estimated maximum multimedia picture size is likely to be exceeded during encoding of the remaining macroblocks. In an embodiment, the QP value may be increased up to a maximum QP value specified by a multimedia-coding standard. In an embodiment, the maximum specified QP value may be configured to be 51. In an embodiment, skip-macroblock encoding of remaining macroblocks corresponding to the multimedia picture may be performed (e.g., using encoding module 304 of FIG. 3) if the number of bits associated with the maximum multimedia picture size is likely to be exceeded during encoding of the remaining macroblocks based on the pre-defined maximum quantization parameter value. More specifically, based on the allocated number of bits, encoding of macroblocks corresponding to the multimedia picture may be initiated. During encoding of the macroblocks, a number of bits that are being consumed may be tracked and a check may be performed to ascertain whether a number of bits (for example, M number of bits) associated with the maximum multimedia picture size is being exceeded. If the maximum multimedia picture size is likely to be exceeded (for example, when encoding macroblocks corresponding to only half of the multimedia picture is about to exhaust the allocated number of bits), then the QP value may be increased to reduce a number of bits to encode the remaining macroblocks (for meeting the target of allocated number of bits). The QP value may be increased up to a maximum QP value (for example, QP value of 51) for encoding of the remaining macroblocks. Performing encoding in such a manner ensures best effort compression under 'close-to-underflow' situation.

In an embodiment, in spite of encoding the remaining macroblocks based on the maximum QP value to restrict the number of bits being consumed during encoding of the macroblocks, if a number of bits consumed may still exceed M, then portions of the multimedia picture (for example, in units of macroblocks corresponding to the multimedia picture) may be skipped during encoding. For example, a partial-picture skip may be performed to meet the target allocated number of bits while ensuring that M number of bits is not exceeded.

At operation 710, buffering period supplemental encoder information (SEI) may be transmitted at pre-defined intervals to the CPB for facilitating decoding of access units received at the CPB from an intermediate access unit in a corresponding access unit sequence. In an embodiment, the buffering period SEI comprises an initial removal delay for access units programmed to match corresponding instances of removal as initially scheduled when decoding of the access units from an initial access unit in the access unit sequence. In an example embodiment, in case of decoder initiating decoding from beginning of the access unit sequence (corresponding to sequence of multimedia pictures in the encoding order), the time difference, $[t_m(n)-t_{af}(n-1)]$, denotes the time for which the $n^{th}$ access unit remains in the CPB. If entire access unit sequence (for example, access units #0 to N) is fully compliant to the HRD, then when the decoder starts decoding from the intermediate access unit in the access unit sequence, the subsequence starting from a particular access unit will still be compliant to the HRD if the initial removal delay is exactly same as the amount of time for which that access unit would have remained in the CPB if the decoding was initiated from the beginning of access unit sequence. For example, if a bit stream corresponding to sequence of access units #0, 1, 2, 999 is fully compliant to the HRD, then a bit-stream corresponding to the access unit subsequence comprising last 300 access units (for example access units #700, 701, 702 . . . 999) is compliant to the HRD, if the access unit #700 is present in the CPB for same amount of time if the decoding was initiated from the beginning of access unit sequence (for example, access unit #0). More specifically, decoding from intermediate access units from among an access unit sequence may be facilitated while maintaining compliance to the HRD 330 if initial removal delay for start of decoding the access unit subsequence 700, 701, . . . 999 computed as $[t_m(700)-taf(699)]$ is equal to removal delay as initially scheduled for decoding original sequence of 1000 frames. In an example embodiment, the initial removal delay may be programmed based on the equation (7) as explained in FIG. 3.

Without in any way limiting the scope, interpretation, or application of the claims appearing below, advantages of one or more of the exemplary embodiments disclosed herein include ensuring strict HRD compliance for real-time encoders even in case of VBR channels. Maintaining a track of arrival times and removal times of access units enables modeling the HRD in units of absolute time as opposed to tracking the occupancy level of the HRD in units of bits providing tighter control in terms of allocation of bits for encoding purposes. Determining the occupancy level at the instant of removal of access unit and respecting the estimated upper limit for every multimedia picture that is encoded enables the encoder to ensure that the decoder buffer does not suffer from buffer underflow or buffer underflow. Further, decoding from intermediate access units from among an access unit sequence is facilitated while maintaining compliance to the HRD by programming initial removal delay for start of decoding the access unit subsequence to be equal to removal delay as scheduled for decoding the original sequence.

Although the present technology has been described with reference to specific exemplary embodiments, it is noted that various modifications and changes may be made to these embodiments without departing from the broad spirit and scope of the present technology. For example, the various devices, modules, analyzers, generators, etc., described herein may be enabled and operated using hardware circuitry (e.g., complementary metal oxide semiconductor (CMOS) based logic circuitry), firmware, software and/or any combination of hardware, firmware, and/or software (e.g., embodied in a machine readable medium). For example, the various electrical structures and methods may be embodied using transistors, logic gates, and electrical circuits (e.g., application specific integrated circuit (ASIC) circuitry and/or in Digital Signal Processor (DSP) circuitry).

Particularly, the system 300, the processing module 302, the encoding module 304, the transceiver module 306 and the memory module 308 of FIG. 3 may be enabled using software and/or using transistors, logic gates, and electrical circuits (e.g., integrated circuit circuitry such as ASIC circuitry). Embodiments of the present disclosure include one or more computer programs stored or otherwise embodied on a computer-readable medium, wherein the computer programs are configured to cause a processor to perform one or more operations. A computer-readable medium storing, embodying, or encoded with a computer program, or similar language, may be embodied as a tangible data storage device storing one or more software programs that are configured to cause a processor to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method comprising:
   estimating an occupancy level of a coded picture buffer (CPB) associated with a hypothetical reference decoder (HRD) based on an upper limit for bit allocation at a removal of an access unit corresponding to a multimedia picture, wherein the upper limit for bit allocation is estimated based on a time or arrival of a previous access unit at the access unit, a removal time for the previous access unit, and a maximum transmission bit rate; and allocating a number of bits for encoding the multimedia picture based on the estimated occupancy level of the CPB.

2. The method of claim 1, wherein the upper limit is estimated for preventing an occurrence of buffer underflow at the CPB.

3. The method of claim 2, where the upper limit is estimated based on:

$$b(n)<=((t_{rn}(n)-t_{ai}(n))*R), \text{ where}$$

b(n) is a number of bits to be allocated for encoding the $n^{th}$ multimedia picture, $t_{rn}(n)$ is a removal time of $n^{th}$ access unit from the CPB, $t_{ai}(n)$ is a time of arrival of first bit of $n^{th}$ access unit at CPB, and R is a maximum transmission channel bit rate corresponding to received access units at the CPB.

4. The method of claim 2, further comprising:
dynamically selecting a quantization parameter value based on the allocated number of bits; and
encoding the multimedia picture based on the selected quantization parameter value.

5. The method of claim 4, further comprising:
determining a maximum multimedia picture size for encoding the multimedia picture.

6. The method of claim 5, further comprising:
tracking a number of bits consumed during encoding of macroblocks corresponding to the multimedia picture, wherein the macroblocks corresponding to the multimedia picture are encoded based on the allocated number of bits;
increasing the quantization parameter value up to a pre-defined maximum quantization parameter value for encoding of remaining macroblocks corresponding to the multimedia picture if a number of bits associated with the maximum multimedia picture size is likely to be exceeded during encoding of the macroblocks; and
performing skip-macroblock encoding of remaining macroblocks corresponding to the multimedia picture if the number of bits associated with the maximum multimedia picture size is likely to be exceeded during encoding of the remaining macroblocks based on the pre-defined maximum quantization parameter value.

7. The method of claim 1, further comprising:
maintaining a track of an arrival time at the CPB and a removal time from the CPB for each access unit received at the CPB, wherein the occupancy level of the CPB is estimated at a plurality of instances of time based on at least one of the track maintained of access units received at the CPB and a transmission channel bit rate corresponding to the received access units at the CPB.

8. The method of claim 7, wherein the transmission channel bit rate is one of a constant bit rate (CBR) and a variable bit rate (VBR).

9. The method of claim 1, further comprising:
transmitting buffering period supplemental encoder information (SEI) at pre-defined intervals to the CPB for facilitating decoding of access units received at the CPB from an intermediate access unit in a corresponding access unit sequence, wherein the buffering period SEI comprises an initial removal delay for access units programmed to match corresponding instances of removal as scheduled when decoding of the access units from an initial access unit in the access unit sequence.

10. The method of claim 9, wherein initial removal delay is programmed as:

$$\text{initial removal delay} = 90000 \times [t_{rn}(n)-t_{af}(n-1)], \text{ where}$$

$t_{rn}(n)$ is a removal time of $n^{th}$ access unit from the CPB, and $t_{af}(n-1)$ is a time of arrival of a last bit of the $(n-1)^{th}$ access unit at CPB.

11. A system comprising:
a processing module configured to:
estimate an occupancy level of a coded picture buffer (CPB) associated with a hypothetical reference decoder (HRD) based on an upper limit for bit allocation at a removal of an access unit corresponding to a multimedia picture, wherein the upper limit for bit allocation is estimated based on a time or arrival of a previous access unit at the access unit, a removal time for the previous access unit, and a maximum transmission bit rate; and
allocate a number of bits for encoding the multimedia picture based on the estimated occupancy level of the CPB; and
an encoding module communicatively associated with the processing module and configured to:
encode the multimedia picture based on the allocated number of bits.

12. The system of claim 11, wherein the processing module is further configured to:
estimate the upper limit for bit allocation is based on:

$$b(n)<=((t_{rn}(n)-t_{ai}(n))*R), \text{ where}$$

b(n) is a number of bits to be allocated for encoding the $n^{th}$ multimedia picture, $t_{rn}(n)$ is a removal time of $n^{th}$ access unit from the CPB, $t_{ai}(n)$ is a time of arrival of first bit of $n^{th}$ access unit at CPB, and R is a maximum transmission channel bit rate corresponding to received access units at the CPB.

13. The system of claim 11, wherein the processing module is further configured to:
determine a maximum multimedia picture size for encoding the multimedia picture; and
track a number of bits consumed during encoding of macroblocks corresponding to the multimedia picture, wherein the macroblocks corresponding to the multimedia picture are encoded based on the allocated number of bits.

14. The system of claim 13, wherein the encoding module is further configured to:
increase a quantization parameter value up to a pre-defined maximum quantization parameter value for encoding of remaining macroblocks corresponding to the multimedia picture if a number of bits associated with the maximum multimedia picture size is likely to be exceeded during encoding of the macroblocks; and
perform skip-macroblock encoding of remaining macroblocks corresponding to the multimedia picture if the number of bits associated with the maximum multimedia picture size is likely to be exceeded during encoding of the remaining macroblocks based on the pre-defined maximum quantization parameter value.

15. The system of claim 11, wherein the processing module is further configured to:
maintain a track of an arrival time at the CPB and a removal time from the CPB for each access unit received at the CPB, wherein the occupancy level of the CPB is estimated at a plurality of instances of time based on at least one of the track maintained of access units received at the CPB and a transmission channel bit rate corresponding to the received access units at the CPB.

16. The system of claim 11, wherein the processing module is further configured to:

transmit buffering period supplemental encoder information (SEI) at pre-defined intervals to the CPB for facilitating decoding of access units received at the CPB from an intermediate access unit in corresponding access unit sequence, wherein the buffering period SEI comprises initial removal delay for access units programmed to match corresponding instances of removal as scheduled when decoding of the access units from an initial access unit in the access unit sequence, wherein the initial removal delay is programmed as:

initial removal delay=$90000 \times [t_{rn}(n) - t_{af}(n-1)]$, where $t_{rn}(n)$ is a removal time of $n^{th}$ access unit from the CPB, and $t_{af}(n-1)$ is a time of arrival of a last bit of the $(n-1)^{th}$ access unit at CPB.

17. A non-transitory computer-readable medium storing a set of instructions that when executed cause a computer to perform a method of encoding of multimedia pictures, the method comprising:

estimating an occupancy level of a coded picture buffer (CPB) associated with a hypothetical reference decoder (HRD) based on an upper limit for bit allocation at a removal of an access unit corresponding to a multimedia picture, wherein the upper limit for bit allocation is estimated based on a time or arrival of a previous access unit at the access unit, a removal time for the previous access unit, and a maximum transmission bit rate; and allocating a number of bits for encoding the multimedia picture based on the estimated occupancy level of the CPB.

18. The non-transitory computer readable medium of claim 17, further comprising:

estimating the upper limit for bit allocation based on:

$b(n) \leq ((t_{rn}(n) - t_{ai}(n)) * R)$, where b(n) is a number of bits to be allocated for encoding the $n^{th}$ multimedia picture, $t_{rn}(n)$ is a removal time of $n^{th}$ access unit from the CPB, $t_{ai}(n)$ is a time of arrival of first bit of $n^{th}$ access unit at CPB, and R is a maximum transmission channel bit rate corresponding to received access units at the CPB.

19. The non-transitory computer readable medium of claim 17, wherein the method further comprises:

maintaining a track of an arrival time at the CPB and a removal time from the CPB for each access unit received at the CPB, wherein the occupancy level of the CPB is estimated at a plurality of instances of time based on at least one of the track maintained of access units received at the CPB and a transmission channel bit rate corresponding to the received access units at the CPB.

20. The non-transitory computer readable medium of claim 17, wherein the method further comprises:

transmitting buffering period supplemental encoder information (SEI) at pre-defined intervals to the CPB for facilitating decoding of access units received at the CPB from an intermediate access unit in corresponding access unit sequence, wherein the buffering period SEI comprises initial removal delay for access units programmed to match corresponding instances of removal as scheduled when decoding of the access units from an initial access unit in the access unit sequence, wherein the initial removal delay is programmed as:

initial removal delay=$90000 \times [t_{rn}(n) - t_{af}(n-1)]$, where $t_{rn}(n)$ is a removal time of an access unit n from the CPB, and $t_{af}(n-1)$ is a time of arrival of a last bit of the $(n-1)^{th}$ access unit at CPB.

* * * * *